United States Patent
Champion et al.

(10) Patent No.: US 8,603,210 B2
(45) Date of Patent: Dec. 10, 2013

(54) AIR FILTER ELEMENT

(75) Inventors: Arnaud Champion, Laval (FR); Gurvan Nabucet, Le Mans (FR)

(73) Assignee: Mann + Hummel GmbH, Ludwigsburg (DE)

( * ) Notice: Subject to any disclaimer, the term of this patent is extended or adjusted under 35 U.S.C. 154(b) by 322 days.

(21) Appl. No.: 13/051,129

(22) Filed: Mar. 18, 2011

(65) Prior Publication Data

US 2011/0232242 A1      Sep. 29, 2011

(30) Foreign Application Priority Data

Mar. 24, 2010   (EP) ..................................... 10290156

(51) Int. Cl.
*B01D 46/00* (2006.01)
(52) U.S. Cl.
USPC ................... 55/483; 55/484; 55/497; 55/521
(58) Field of Classification Search
USPC ................... 55/483, 484, 497, 521
See application file for complete search history.

(56) References Cited

U.S. PATENT DOCUMENTS 6,780,217 B1 *  8/2004  Palmer ............................ 55/502
2010/0051530 A1    3/2010  Manz

FOREIGN PATENT DOCUMENTS

WO       2006052094 A1    5/2006

OTHER PUBLICATIONS

Extended EP search report of EP 10 29 0156.8, dated Jun. 2, 2010.
EPO Search Report of EP 10290156.8-2113, dated Jun. 2, 2010.

* cited by examiner

*Primary Examiner* — Robert Clemente
(74) *Attorney, Agent, or Firm* — James Hasselbeck

(57) ABSTRACT

An air filter element (10) has a substantially planar configuration and comprises at least two pleated filter media (12, 12'), said pleated filter media (12, 12') being arranged side by side and attached to each other in a permanent way by a connecting member (16) connecting facing longitudinal edges (14, 14') of said filter media (12, 12').

6 Claims, 1 Drawing Sheet

AIR FILTER ELEMENT

CROSS REFERENCE TO RELATED APPLICATIONS

This application claims the benefit under 35 USC 119 of European Patent Application 10290156.8 filed on Mar. 24, 2010, and which is hereby incorporated by reference in its entirety.

TECHNICAL FIELD

The invention relates to an air filter element, having a substantially planar configuration.

BACKGROUND OF THE INVENTION

Filter elements of this kind generally serve for filtration of gaseous media and are widely used as particulate air filters for removal of solid particulates such as dust, pollen etc. They may e.g. be placed in the outside air intake of a vehicles passenger compartment or may be used as combustion air filters to prevent abrasive particulate matter from entering an engine's cylinders, where the particulate matter would cause mechanical wear and possibly damage.

In practical applications, a filter element is usually placed in a filter casing, which, especially in mobile vehicles, offers very limited space. The efficiency of filter elements, on the other hand, strongly depends on the size of the surface area provided by the filter element for the passage of the medium to be filtered.

To improve filtration performance of such filter elements, the size of the surface of the filter element may be increased. With regard to the limited space provided by the respective casings, this can be achieved by an increased pleat height of the pleated filter medium.

However, when increasing the pleat height, pleat stability may be a problem when a certain pleat height is exceeded, the stability of the pleats depending also on the width of the filter element, i.e. on the length of the folding edges of the pleats. In other words, it is difficult to provide a filter element with has both a considerable pleat height and element width, as in such filter elements, the pleats tend to collapse due to their own weight and/or due to the flux of the gaseous medium that needs to be filtered. Thus, the passage for the medium to be filtered may become at least partially obstructed, increasing overall flow resistance and thereby decreasing efficiency of the filter element. As the stability of the pleats depends on the stiffness of the material of the filter medium used, this problem is particularly relevant when using filter media having a comparatively low stiffness, such as non-woven filter media.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not in-tended to identify key or critical elements of the invention or to delineate the scope of the invention. Its sole purpose is to present some concepts in a simplified form as a prelude to the more detailed description that is discussed later.

One aspect of the invention relates to an air filter element having a substantially planar configuration and comprising at least two pleated filter media, said pleated filter media being arranged side by side and attached to each other in a permanent way by a connecting member connecting facing longitudinal edges of said filter media.

As a result of arranging two pleated filter elements side by side along their longitudinal direction, i.e. essentially perpendicular to the folding edges of the pleats, a filter element can be provided having both a considerable pleat height and element width, thus overcoming the pleat instability problems of conventional filter elements. By connecting the pleated filter media in a permanent way, a self-supporting filter element can be provided, having an increased surface area and thus improved filtration performance. Accordingly, the filter element allows using new filter layouts and is thus capable of meeting a broader range of needs. Moreover, such a filter element can be manufactured at low costs.

According to the invention, the connecting member may comprise at least one material strip, preferably of fibrous, in particular of non-woven material. Both sides of the material strip may serve as abutment surfaces for the pleated filter media to be joined along their longitudinal edges, thereby simplifying an exact alignment of the pleated filter media and thus the assembly of the filter element. Alternatively, the connecting member may be formed by two material strips, each being fixed (e.g. glued) to the longitudinal edges of the filter media for stabilization purposes. The two material strips of the filter media may be bonded (glued together) for forming an air filter element with increased width. Using one or more (rectilinear) material strips which are directed perpendicularly to the up-per and lower planes of the substantially planar configuration of the filter element allows for further stabilization of the pleats.

For ease of manufacturing and yet a robust connection of the pleated filter media, the connecting member may be adhesively bonded, in particular glued, to the pleated filter media.

To further stabilize the pleats of the filter media material, at least one further material strip, particularly a glue strip, may be provided on the longitudinal faces/edges of the filter media away from the facing longitudinal edges where the filter media are attached to each other. The further material strip bridges and cross-links at least two, typically all pleats of the respective filter medium. The further material strip may be a single glue strip, which preferably runs across the total length of the filter element, being arranged essentially perpendicular to the folding edges of the pleats of the filter media.

The pleated filter medium is preferably made from a non-woven, particularly synthetic, fibrous material. Depending on the area of application, the fibrous material may be cellulose or a cellulosic plastic or any other synthetic polymer suitable for filtering purposes. Although such filter materials have comparatively low stiffness and thus comparatively low pleat stability, using the inventive concept, an air filter element of considerable width and pleat height may be formed from these materials.

With respect to a sealed fit of the filter element in a respective filter casing, a sealing strip, in particular a gasket, may be provided on top of the filter media of the air filter element, typically covering a circumferential portion of the filter element. The sealing strip may be devised in the form of a frame which runs across the longitudinal and transversal edges of a planar upper face of the filter element, the sealing strip at least partially projecting beyond the planar face of the filter element, possibly also projecting beyond the filter media in a longitudinal and/or transversal direction. The sealing strip may be made e.g. of polyurethane or other suitable polymers.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
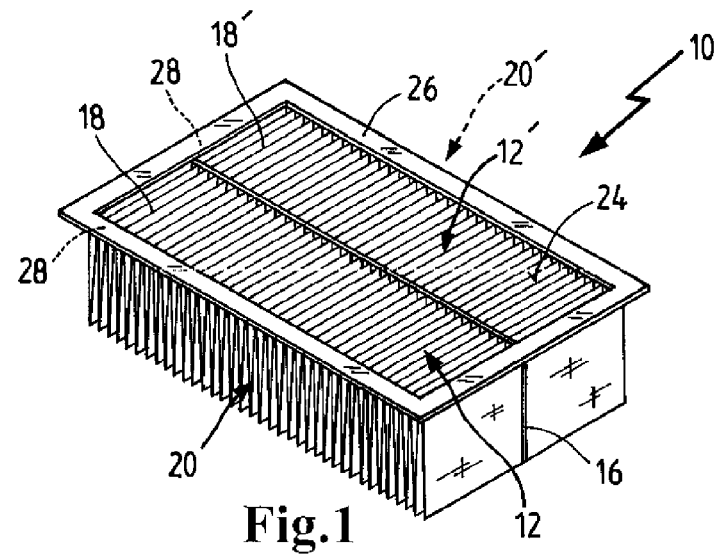
FIG. 1 is a perspective view of an air filter element comprising two pleated filter media being arranged side by side.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an air filter element. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference now to various figures in which identical elements are identically numbered throughout, a description of a preferred embodiments will be provided.

FIG. 1 shows a filter element 10 intended for use as a combustion air filter in a motor vehicle to prevent abrasive particulate matter from entering an engine's cylinders. To this end, the filter element 10 has an overall shape that is tailored to fit into a given filter casing, which is located in a respective air intake of an engine.

The filter element 10 has a substantially planar configuration and comprises two pleated filter media 12, 12' (pleated strips of filter material) that are both made from a non-woven material. The pleated filter media 12, 12' are connected with each other at their facing longitudinal edges 14, 14' (cf. FIG. 2) by a connecting member 16 such that corresponding folding edges 18, 18' of the pleated filter media 12, 12' are aligned. In the present example, the connecting member 16 is formed by a material strip which is made from a paper material, it also being possible to devise the material strip from other, typically fibrous, materials.

Figure 2:
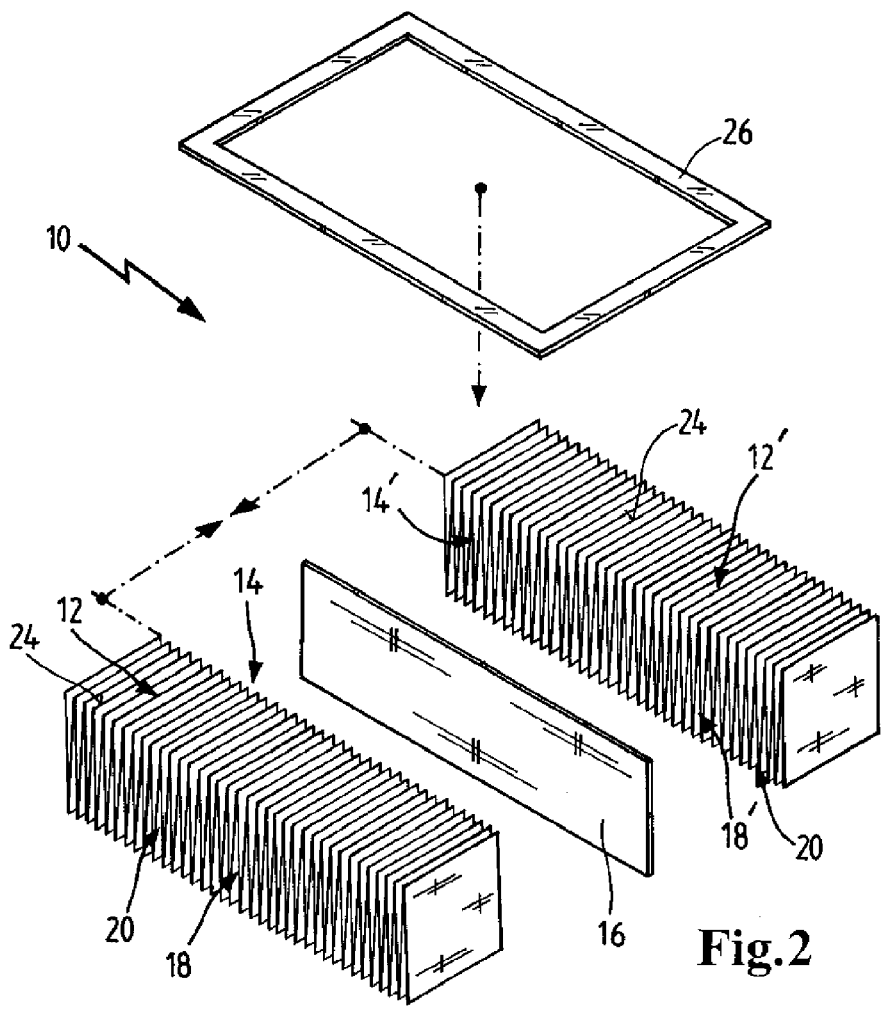
FIG. 2 is an exploded view of the filter element shown in FIG. 1.

The connecting member 16 is adhesively bonded (glued) to the pleated filter media 12, 12' and has a surface area that basically matches the length and height of the filter media 12, 12', as can be best seen in FIG. 2. The connecting member 16 stabilizes the filter media 12, 12' together with the adhesive used for bonding, as it is resistant to bending, thereby serving as a supporting structure for the filter media 12, 12'. The connecting member 16 (support structure) is selected to be resistant to bending under the forces applied to the filter media 12, 12' by the action of the air flowing through the filter element 10, thereby keeping the pleated filter media 12, 12' from deflecting or bending substantially in the direction of the airflow. Additionally, securing the longitudinal faces 14, 14' of the pleat folds to the connecting member 16 advantageously acts to fix the pleat spacing (spacing between adjacent media pleats), thereby assuring that adequate spacing remains between adjacent pleats, thereby preventing loss of filter media filtering area due to some adjacent pleats deforming against each other.

The filter element 10 may additionally comprise further material strips (not shown) arranged at outer longitudinal edges 20, 20' of the filter media 12, 12', the further material strips further increasing stability of the air filter element 10, thus preventing a collapse of the pleated filter media 12, 12', possibly caused by rugged manipulation or by forces of a high air volume flow rate.

The filter element 10 is further provided with a sealing strip 26 (gasket) covering a circumferential portion of the filter element 10 at its upper surface 24. In the present example, the sealing strip 26 is devised as a frame which covers longitudinal and transversal edges 28 of the circumferential portion of the planar up-per surface 24 of the filter element 10, the sealing strip 26 projecting both beyond the planar upper face 24 of the filter element 10 and also beyond the edges of the filter media 12, 12' in a longitudinal and transversal direction.

The sealing strip 26 is made of a highly elastic material, e.g. of an elastic synthetic polymer such as polyurethane, and is adhesively bonded (glued) to the filter media 12, 12' of the filter element 10. The filter element 10 shown herein is of a rectangular shape. It should be noted, however, that, according to alternative embodiments of the invention, it may as well have a circular, an oval, a trapezoidal, or a stepped outer shape.

It is to be understood that the filter element 10 may comprise more than two filter media 12, 12' arranged side by side and connected by connecting members in the way described above. The filter element 10 may also comprise more than two layers of filter media 12, 12' stacked on top of each other in a conventional way.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. An air filter element having a substantially planar configuration, said air filter element comprising
    at least two pleated filter media, said pleated filter media being arranged side by side and secured to each other in a permanent way by a connecting member connecting facing longitudinal edges of said filter media,
    wherein said connecting member is one material strip of a fibrous non-woven material with each one of both opposing sides of said one material strip serving as an abutment surface for a respective one of said at least two pleated filter media,
    wherein each of the two abutment surfaces of said one material strip are secured onto said longitudinal edges of a different one of said at least two pleated filter media.

2. The air filter element according to claim 1, wherein said connecting member is adhesively secured to said longitudinal edges of said filter media.

3. The air filter element according to claim 2, wherein said connecting member is resistant to bending such that said connecting member serves as a support structure supporting said filter media against bending.

4. The air filter element according to claim 3, further comprising
    at least one material strip, each arranged along and secured to an outer longitudinal edge of said filter media,
    said at least one material strip providing additional resistance to bending such that said at least one material strip serves as an additional support structure supporting said filter media against bending.

5. The air filter element according to claim 1, wherein said pleated filter media are made from a non-woven synthetic material.

6. The air filter element according to claim 1, further comprising
    a sealing strip configured as a gasket and provided at a circumferential portion of a planar upper surface of said air filter element.

* * * * *